United States Patent
Filsfils et al.

(10) Patent No.: US 10,516,610 B2
(45) Date of Patent: Dec. 24, 2019

(54) SEGMENT ROUTING PACKET POLICIES AND FUNCTIONS PROVIDING PROCESSING SIGNALING AND PACKET FORWARDING EFFICIENCIES IN A NETWORK

(71) Applicant: Cisco Technology, Inc., San Jose, CA (US)

(72) Inventors: Clarence Filsfils, Brussels (BE); Francois Clad, Strasbourg (FR); Pablo Camarillo Garvia, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/922,894

(22) Filed: Mar. 15, 2018

(65) Prior Publication Data

US 2019/0288941 A1    Sep. 19, 2019

(51) Int. Cl.
*H04L 12/741* (2013.01)
*H04L 29/06* (2006.01)

(52) U.S. Cl.
CPC .............. *H04L 45/74* (2013.01); *H04L 69/22* (2013.01)

(58) Field of Classification Search
CPC ... H04L 45/74; H04L 69/22; H04L 29/06095; H04L 29/0653; H04L 49/3009; H04L 49/309
See application file for complete search history.

(56) References Cited

U.S. PATENT DOCUMENTS

| | | | |
|---|---|---|---|
| 8,230,098 B2* | 7/2012 | Chen | H04L 65/4084 370/389 |
| 9,444,677 B2* | 9/2016 | Kumar | H04L 41/0668 |
| 9,537,769 B2* | 1/2017 | Bryant | H04L 45/745 |
| 9,762,488 B2 | 9/2017 | Prevedi et al. | |
| 9,838,246 B1* | 12/2017 | Hegde | H04L 41/0668 |
| 10,063,475 B2 | 8/2018 | Prevedi et al. | |

(Continued)

OTHER PUBLICATIONS

Filsfls et al., "SRv6 Network Programming," draft-filsfils-spring-srv6-network-programming-04, Mar. 4, 2018, The Internet Society, Reston, VA, USA (fifty-seven pages).

(Continued)

*Primary Examiner* — Sharad Rampuria
(74) *Attorney, Agent, or Firm* — The Law Office of Kirk D. Williams

(57) ABSTRACT

In one embodiment, segment routing network processing of packets is performed, including using segment routing packet policies and functions providing segment routing processing signaling and packet forwarding efficiencies in a network. A segment routing node signals to another segment routing node using a signaled segment identifier in a segment list of a segment routing packet with the segments left identifying a segment list element above the signaled segment identifier. A downstream segment routing node receives the segment routing packet, obtains this signaled segment identifier, and performs processing of one or more packets based thereon. In one embodiment, a provider edge node replaces its own segment identifier in a received customer packet, with a downstream customer node using the replaced (signaling) segment identifier (of a provider edge node/segment routing function) for accessing a return path through the provider network.

14 Claims, 9 Drawing Sheets

(56) References Cited

U.S. PATENT DOCUMENTS

| | | | |
|---|---|---|---|
| 10,382,334 | B2 | 8/2019 | Prevedi et al. |
| 2015/0256456 | A1 | 9/2015 | Prevedi et al. |
| 2018/0375968 | A1* | 12/2018 | Bashandy .......... H04L 12/4633 |

OTHER PUBLICATIONS

Filsfls et al., "Segment Routing Architecture," draft-ietf-spring-segment-routing-15, Jan. 25, 2018, The Internet Society, Reston, VA, USA (thirty-one pages).

Previdi et al., "IPv6 Segment Routing Header (SRH)," draft-ietf-6man-segment-routing-header-10, Mar. 17, 2018, The Internet Society, Reston, VA, USA (thirty-three pages).

Rekhter et al, "A Border Gateway Protocol 4 (BGP-4)," RFC 4271, Jan. 2006, The Internet Society, Reston, VA, USA (104 pages).

Bates et al., "Multiprotocol Extensions for BGP-4," RFC 2283, Feb. 1998, The Internet Society, Reston, VA, USA (nine pages).

Deering et al., "Internet Protocol, Version 6 (IPv6) Specification," RFC 2460, Dec. 1998, The Internet Society, Reston, VA, USA (thirty-nine pages).

S. Deering and R. Hinden, "Internet Protocol, Version 6 (IPv6) Specification," RFC 8200, Jul. 2017, The Internet Society, Reston, VA, USA (forty-two pages).

T. Bates et al., "Multiprotocol Extensions for BGP-4," RFC 4760, Jan. 2007, The Internet Society, Reston, VA, USA (twelve pages).

Rosen et al., "Multiprotocol Label Switching Architecture," RFC 3031, Jan. 2001, The Internet Society, Reston, VA, USA (sixty-one pages).

"Information technology—Telecommunications and information exchange between systems—Intermediate System to Intermediate System intra-domain routeing information exchange protocol for use in conjunction with the protocol for providing the connectionless-mode network service (ISO 8473)," Second Edition, Nov. 15, 2002, ISO/IEC 2002, Switzerland (210 pages).

* cited by examiner

SEGMENT ROUTING PACKET POLICIES AND FUNCTIONS PROVIDING PROCESSING SIGNALING AND PACKET FORWARDING EFFICIENCIES IN A NETWORK

TECHNICAL FIELD

The present disclosure relates generally to sending of packets through a packet network, such as, but not limited to, according to segment routing of packets through a packet network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network based one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
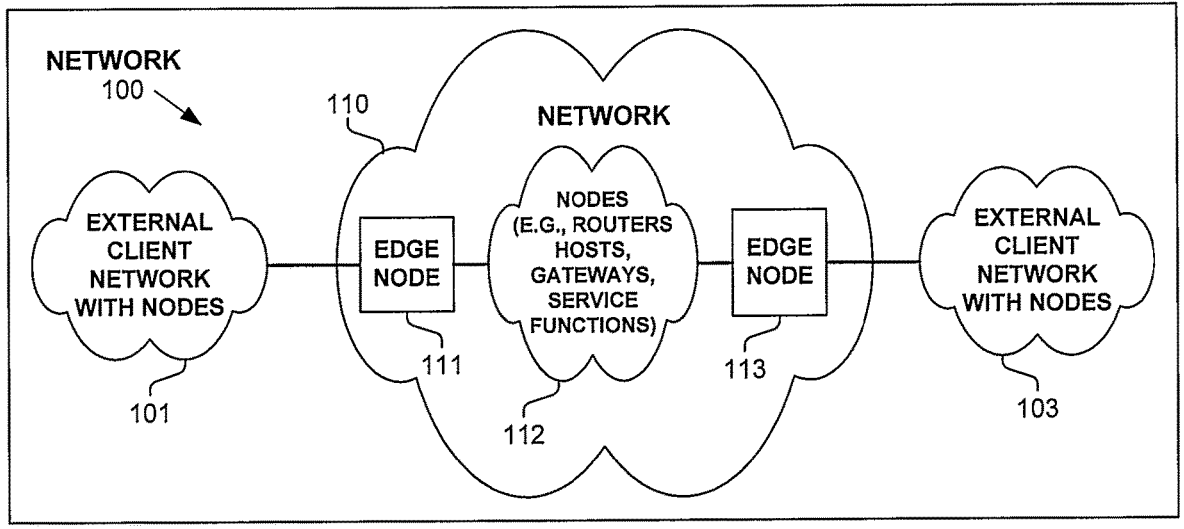
FIG. 1A illustrates a network operating according to one embodiment.

Disclosed are, inter alia, methods, apparatus, computer-storage media, mechanisms, and means associated with segment routing network processing of packets including segment routing packet policies providing segment routing processing signaling and packet forwarding efficiencies in a network. A segment routing node (e.g., router, host) signals to another segment routing node using a signaled segment identifier in a segment list of a segment routing packet with the segments left identifying a segment list element above the signaled segment identifier. Thus, normal segment routing semantics dictate that the signaled segment identifier has already been segment routing processed. In one embodiment, a downstream segment routing node receives the segment routing packet, obtains this signaled segment identifier, and performs segment routing processing of one or more packets based thereon. In one embodiment, a segment routing node replaces its own segment identifier in a segment list of a received packet; while in one embodiment, a segment routing node initially creates a segment routing packet with the segments left identifying a segment list element above the signaled segment identifier in a segment list.

In one embodiment, a first segment routing node receives a particular segment routing packet including a particular segment routing header comprising a particular segment list and a particular segments left. The particular segment list when said received by the first segment routing node comprises a particular segment identifier, with the segments left when said received identifying a segment list element of, or above, the particular segment identifier in the particular segment list. The first segment routing node updates and then sends the particular segment routing packet into the network. In one embodiment, the updating includes replacing the particular segment identifier with a signaled segment identifier in the particular segment list, and when the particular segment routing packet is said sent from the first segment routing node the segments left identifies a segment identifier above the signaled segment identifier in the particular segment list.

In one embodiment, a second segment routing node receives the particular segment routing packet (after sending by the first segment routing node) with the segments left specifying a segment identifier above the signaled segment identifier in the particular segment list. The second segment routing node obtains the signaled segment identifier from the particular segment list, and sends into the network a specific segment routing packet comprising a specific segment list or an Internet Protocol destination address including said obtained signaled segment identifier.

In one embodiment, a third segment routing node having an Internet Protocol address of the signaled segment identifier receives the specific segment routing packet, and then performs received signal packet processing on the specific segment routing packet according to a received signaled segment identifier function identified in the signaled segment identifier. In one embodiment, said received signal packet processing includes adding to the specific segment routing packet one or more response path segment identifiers specifying a segment routing path through the network. In one embodiment, said updating by the first segment routing node includes adding to the particular segment routing packet one or more source path segment identifiers specifying a segment routing path through the network. In one embodiment, the first segment routing node and the third segment routing node are provider edge routers; and wherein the second segment routing node is a customer host device.

2. Description

Disclosed are, inter alia, methods, apparatus, computer-storage media, mechanisms, and means associated with segment routing network processing of packets including segment routing packet policies providing segment routing processing signaling and packet forwarding efficiencies in a network. As used herein segment routing includes using Internet Protocol Version 4 and/or 6 (IPv4 and/or IPv6) addresses as segment identifiers (SIDs). Further, segment routing includes IPv6 SR (SRv6) and/or IPv4 (SRv4).

The terms "node" or "network node" are used herein to refer to a router or host. The term "route" is used herein to refer to a fully or partially expanded prefix/route (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix. Also, as used herein, "forwarding information" includes, but is not limited to, information describing how to process (e.g., forward, send, manipulate, modify, change, drop, copy, duplicate, receive) corresponding packets. In one embodiment, determining forwarding information is performed via an ingress lookup operation and an egress lookup operation. Also, the term "processing" when referring to processing of a packet process refers to a broad scope of operations performed in response to a packet, such as, but not limited to, forwarding/sending, dropping, manipulating/modifying/changing, receiving, duplicating, creating, applying one or more service or application functions to the packet or to the packet switching device (e.g., updating information), etc. Also, as used herein, the term processing in "parallel" is used in the general sense that at least a portion of two or more operations are performed overlapping in time.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

In one embodiment, a segment routing node (e.g., router, host) signals to another segment routing node using a signaled segment identifier in a segment list of a segment routing packet with the segments left identifying a segment list element above the signaled segment identifier. Thus, normal segment routing semantics dictate that the signaled segment identifier has already been segment routing processed. In one embodiment, this signaled segment identifier replaces a segment identifier that is at the bottom of the segment list (furthest from the beginning of its segment routing header). In one embodiment, there are one or more segment identifiers at or below the segment identifier of a signaling router in the segment list of a received packet, with the signaling router replacing any one or more of these segment identifiers. In one embodiment, multiple segment routing nodes in a same packet signal via one or more signaled segment identifiers, such as by, but not limited to, replacing different segment identifier positions such as replacing their own segment identifier (e.g., for multiple nodes to signal multiple values in a same packet, such as, but not limited to, packet timestamp or other instrumentation information that could be used in determining performance metrics, traversal path, or other result). In one embodiment, multiple segment routing nodes in a same packet signal via one or more signaled segment identifiers, such as by, but not limited to, replacing a same one or more segment identifier positions in the segment list providing for updating the signaled segment identifier(s) (e.g., to reflect a current state associated with an aspect of the network or the packet). In one embodiment, each particular signaling router of one or more signaling routers replaces any one or more of the segment identifiers in the segment list with one or more signaled segment identifiers, such that the resulting segment routing packet sent from the particular signaling router has the segments left identifying a segment list element above the signaled segment identifier(s).

In one embodiment, a downstream segment routing node receives the segment routing packet, obtains this signaled segment identifier, and performs corresponding segment routing, network application, or other processing of one or more packets. One embodiment provides signaling between any two segment routing nodes in a network, such, but not limited to, regarding segment routing or network application processing of packets. In one embodiment, a segment routing node replaces its own segment identifier in a segment list of a received packet; while in one embodiment, a segment routing node initially creates a segment routing packet with the segments left identifying a segment list element above the signaled segment identifier in a segment list.

In one embodiment, a network provider discriminates the path over which certain flows of packet traffic take through the network, such as, but not limited to, providing a corresponding quality/class of service and/or apply one or more network services. For example, certain types of traffic may be associated with priority level and/or have transport requirements (e.g., bandwidth, latency, delay). These requirements may be inherent in the nature of the traffic, per a service-level agreement, etc.

Some networking communications require the messages exchanged between two end hosts to traverse the network along the same path in both directions, or at least pass through a same network node or cooperating network nodes providing a network service. In particular, some network nodes, such as network address translation (NAT) nodes or firewalls, typically require packets of a bidirectional communication between nodes to go through them in both directions as the processing of packets may be dependent on state stored within one of these network application nodes.

On the other hand, asymmetric forwarding may be preferred in other scenarios, in particular when the traffic is itself asymmetric. Data transfers, for example, usually involve high volume traffic in the direction where the data goes (e.g., from server to client), but traffic in the reverse direction may be very low. In such case, a network operator may want to steer packets, via a segment routing policy, along a traffic engineered path with more available bandwidth, while leaving the returning acknowledgements on a different segment routing path or a default path determined by standard routing of Internet Protocol packets (e.g., using Open Shortest Path First).

FIG. 1A illustrates a segment routing network 100 operating according to one embodiment. As shown, network 100 includes client networks 101 and 103 (which are the same network in one embodiment) communicatively coupled to segment routing (SR) provider network 110. In one embodiment, each of client networks 101 and 103 include hosts (e.g., end nodes) with upper-layer applications that communicate via network 100. In one embodiment, some of the hosts in client network 101 and/or 103 are SR-capable in that they can generate and process segment routing packets.

In one embodiment, segment routing network 110 (e.g., a provider network) includes segment routing edge nodes 111 and 113, and a network 112 of network nodes including SR-capable routers (and possibly some that are not SR-capable in that they do not process a segment routing header/complete segment identifier), SR gateways, service functions, and hosts (e.g., end nodes). In one embodiment, SR edge nodes 111 and 113 process packets received from networks 101 and 103, which may include encapsulating or otherwise processing these packets into SR packets such as adding a SR header (and possibly another IP header) to these packets according to a data plane ascertained segment routing policy, and subsequently decapsulating or removing a segment routing header (and possibly another IP header) and forwarding the native (segment routing or IP) packets into network 101 and 103.

In one embodiment and in response to receiving a packet, a segment routing edge node 111, 113 and/or a segment routing node within network 112 determines a segment routing policy (e.g., list of complete segment identifiers) through and/or to which to forward a segment routing packet encapsulating the native packet. These policies can change in response to network conditions, network programming, etc. In one embodiment, the segment routing policy specifies to add one or more SR headers, each with one or more segment identifiers, resulting in a segment routing packet having one or more segment routing headers. In one embodiment, a native packet is received without a segment routing header, and the segment routing node encapsulates the native packet in a segment routing packet including one or more added segment routing headers, each including one or more segment identifiers. In one embodiment, a segment routing packet is received with a segment routing header, and with segment routing node adding one or more segment routing headers resulting in a segment routing packet including one or more added segment routing headers, each including one or more segment identifiers. In contrast, and for each of these scenarios a single segment routing header could have been used that includes all of the segment identifiers.

In one embodiment, ingress network provider edge node 111 replaces its own segment identifier in a customer packet received from client network 101 with a signaled segment identifier of return ingress edge node 113 for accessing a return path network service through network 110. Additionally in one embodiment, ingress network provider edge node 111 adds one or more segment identifiers to the packet (e.g., in a segment routing encapsulating header) to correspondingly steer the packet through the provider network 110 (e.g., to provide a corresponding quality/class of service, apply network services), with these added segment identifiers typically removed by egress network provider edge node 113 before sending the packet to the downstream customer segment routing node in client network 103.

In one embodiment, the customer node receives the packet, obtains the signaled segment identifier, and processes the packet (e.g., the data/payload). A response segment routing packet is created with a segment routing header including the segments left identifying the obtained signaling segment identifier placed at the bottom of the segment list and also placed in the Internet Protocol destination address of the packet. The response packet is sent to ingress network segment routing node 113 (as it has an Internet Protocol address of the signaling segment identifier). Ingress edge node 113 segment routing processes the packet based on the signaled segment identifier, and correspondingly sends through the provider network (e.g., over a same path traversed by the original packet but in reverse or over a different path, which may include adding one or more segment identifiers steering the packet through network 110). In one embodiment, different ingress and egress edge nodes are used in communicating with client network 103.

Figure 1B:
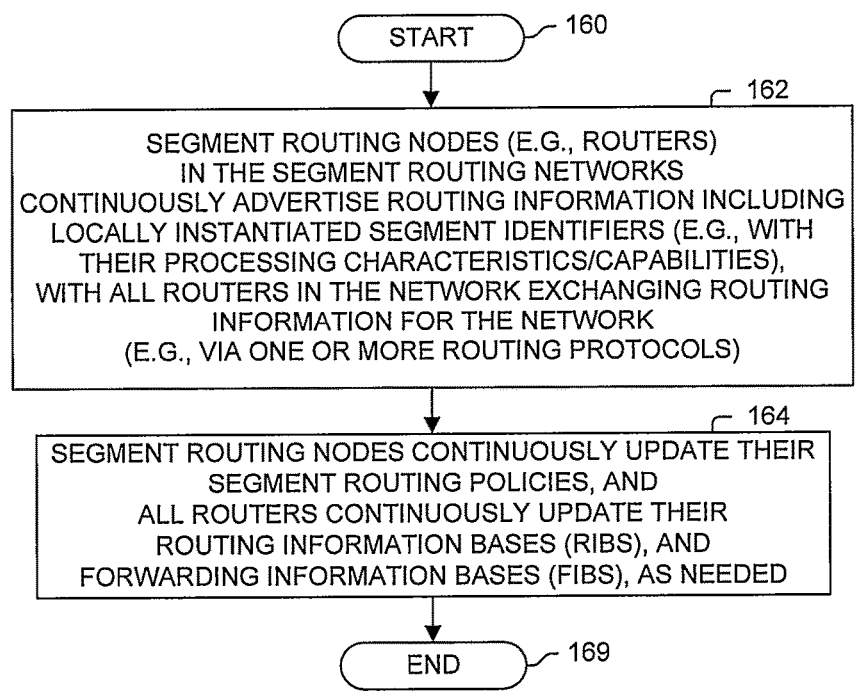
FIG. 1B illustrates a process according to one embodiment.

FIG. 1B illustrates a process according to one embodiment associated with segment routing network processing of packets including segment routing packet policies providing segment routing processing signaling and packet forwarding efficiencies in a network. Processing begins with process block 160. In process block 162, segment routing and non-segment routing nodes in the network(s) continuously advertise and exchange routing information including segment routing information (e.g., routes including segment identifiers of network nodes and their corresponding function or function/arguments, attributes of segment identifiers, attributes of node) and other routing information (e.g., IPv4 or IPv6 topology information) typically via one or more routing protocols and/or other protocols. In one embodiment, a segment identifier or other route associated with a network node is advertised with an attribute indicating whether penultimate segment popping (PSP) will or will not be correspondingly performed.

In one embodiment, a segment routing node advertises a signaled segment identifier. In one embodiment, a destination-coupled network provider edge node advertises a response path segment identifier which is inserted into a customer packet as the signaled segment identifier by a source-coupled network provider edge node.

In one embodiment, a particular segment routing node advertises a processing segment identifier identifying an obtain signaled segment identifier function that obtains the signaled segment identifier and performs corresponding processing. In one embodiment, a source customer node includes the processing segment identifier in a segment routing header of a packet so that the packet will reach the particular segment routing node.

In one embodiment, the advertised processing segment identifier is a fully-expanded prefix/route. In one embodiment, the advertised processing segment identifier is a partially-expanded prefix/route. In one embodiment, a sending segment routing node communicates to the obtain signaled segment identifier function a location of the signaled segment identifier in a segment list of a packet (e.g., instead of a default location such as, but not limited to, the bottom segment identifier in the segment routing header). In one embodiment, this location is included in the packet (e.g., in a Type Length Object value, inserted in the low-order bits of an advertised partially-expanded segment identifier of the obtain signaled segment identifier function a location, elsewhere in the packet). In one embodiment, this location is communicated out-of-band, possibly from another node or management system.

In process block 164, segment routing and other network nodes continuously update their segment routing policies and routing information as required (e.g., based on information received via a routing protocol, from a network management system, etc.). Processing of the flow diagram of FIG. 1B is complete as indicated by process block 169.

Figure 2A:
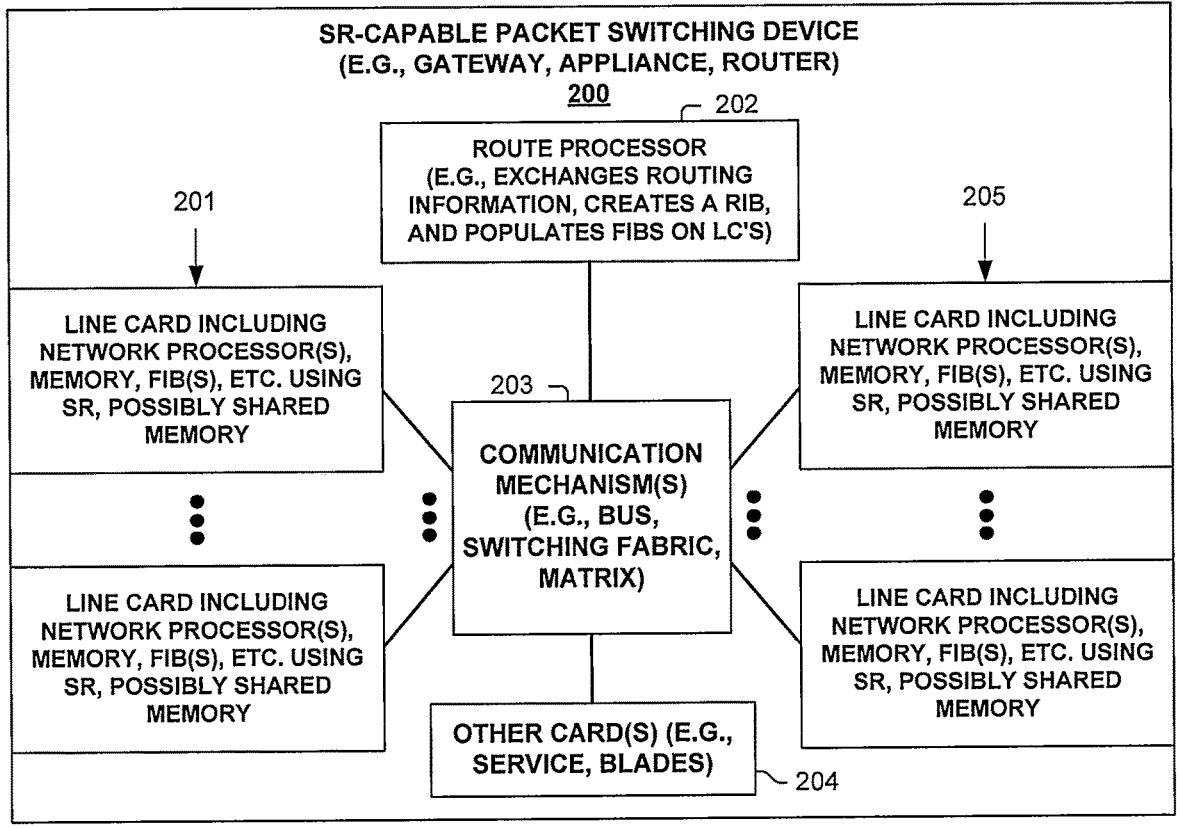
FIG. 2A illustrates a packet switching device according to one embodiment.
Figure 2B:
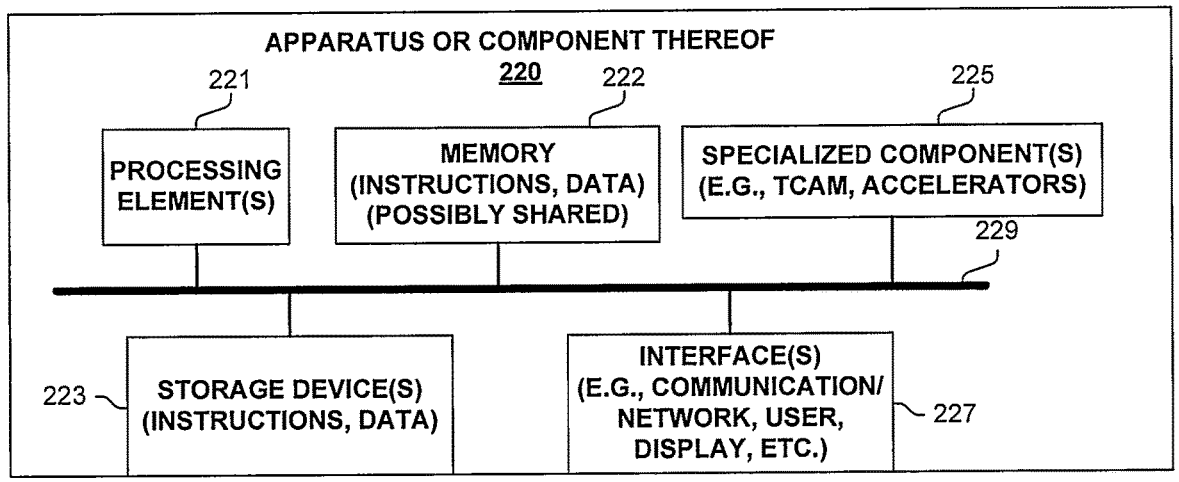
FIG. 2B illustrates an apparatus according to one embodiment.

FIGS. 2A-B and their discussion herein provide a description of various SR network nodes according to one embodiment.

FIG. 2A illustrates one embodiment of a segment routing-capable packet switching device 200 (e.g., SR gateway, appliance, router, host, end node) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with segment routing network processing of packets including segment routing packet policies providing segment routing processing signaling and packet forwarding efficiencies in a network. Packet switching device 200 also has a control plane with one or more processing elements 202 for managing the control plane and/or control plane processing of packets associated with segment routing network processing of packets including segment routing packet policies providing segment routing processing signaling and packet forwarding efficiencies in a network. Packet switching device 200 also includes other cards 204 (e.g., service cards, blades) which include processing elements that are used in one embodiment to process (e.g., forward/send, drop, manipulate, change, modify, receive, create, duplicate, perform SR gateway functionality possibly with shared memory with one or more service functions, apply a service according to one or more service functions) packets associated with segment routing network processing of packets including segment routing packet policies providing segment routing processing signaling and packet forwarding efficiencies in a network, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, SR gateway and service functions are implemented on a line card 201, 205.

FIG. 2B is a block diagram of an apparatus 220 used in one embodiment associated with segment routing network processing of packets including segment routing packet policies providing segment routing processing signaling and packet forwarding efficiencies in a network. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup and/or packet processing operations and/or service function, associative memory, binary and/or ternary content-addressable memory, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
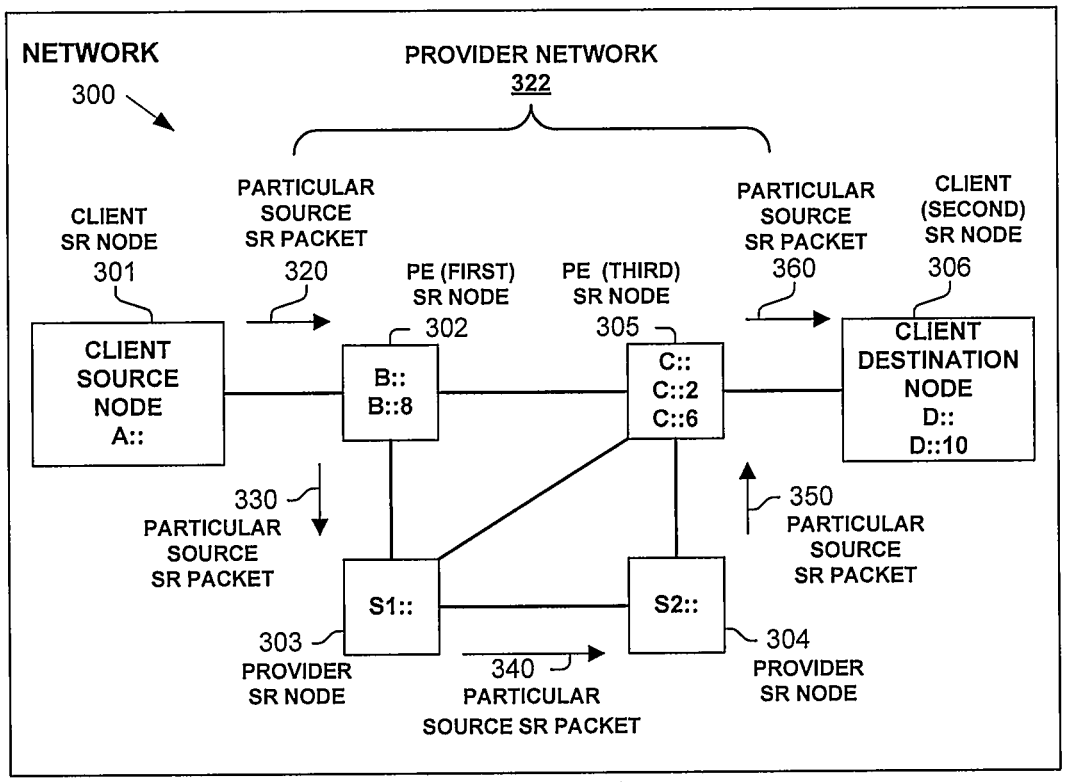
FIG. 3A illustrates a network operating according to one embodiment.

FIG. 3A illustrates a network 300, including its operation according to one embodiment. As shown, network 300 comprises:

- (client) segment routing source node 301 including an advertised IP address of A::;
- (network provider) segment routing node 302 including advertised IP address of B:: and advertised segment identifier (IP address) of B::8 (with B::8 including a function value to invoke a signaling segment identifier function to at least add the signaled segment identifier to a packet, and possibly to add a network forwarding policy through provider network 322);
- (network provider) segment routing node 303 including an advertised segment identifier (IP address) of S1::;
- (network provider) segment routing node 304 including an advertised segment identifier (IP address) of S2::;
- (network provider) segment routing node 305 including advertised IP address of C::, and advertised segment identifiers (IP addresses) of C::2 and C::6 (with C::2 including an attribute of not performing penultimate segment popping (PSP) on the segment routing packet, and with C::6 which will invoke a received signal segment routing identifier function to add to a packet a network forwarding policy through provider network 322); and
- (client) segment routing destination node 306 including advertised IP address of D:: and advertised segment identifier (IP address) of D::10 (with D::10 which will invoke an obtain signaled segment identifier function to acquire the signaled segment identifier from a packet and perform corresponding segment routing processing).

In one embodiment, a source application of client source node 301 determines to communicate with a destination application in client destination node 304 using a bi-directional provider network service offering by provider network 322. To use this network service, client source node 301 will send packets to provider network edge node 302 with a segment list including segment identifier B::8 (which will invoke a signaling segment identifier function on provider edge node 302) and segment identifier D::10 (which will invoke obtain signaled segment identifier function on client destination node 306).

Shown in the figures is a same particular source segment routing packet that is denoted using reference numbers 320, 330, 340, 350, and 360 for referencing modifications to the same particular source segment routing packet as it traverses network 300. Also, FIGS. 3A-D and 4A-C and their descriptions use the same reference number to refer to corresponding items as illustrated and/or described in relation to network 300 of FIGS. 3A and 4A.

As shown in FIG. 3A and according to a network service offering, the particular source packet is communicated from client source node 301 to client destination node 304 via network provider segment routing nodes 302, 303, 304, and 305. In one embodiment, this path traversing segment routing nodes 302, 303, 304, and 305 through provider network 322 is determined by a segment routing policy associated with a signaling segment identifier function of provider edge node 302 invoked by segment identifier B::8.

Figure 3B:
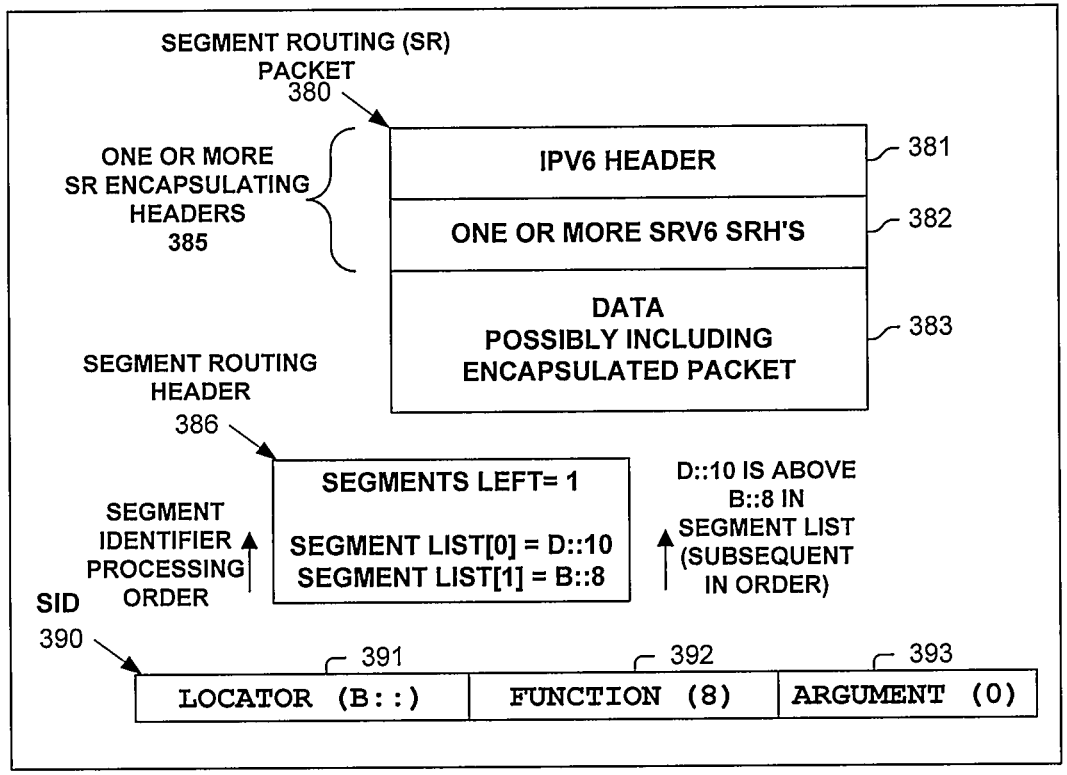
FIG. 3B illustrates a segment routing packet according to one embodiment.

FIG. 3B illustrates a segment routing (SR) packet 380 according to one embodiment. As shown, SR packet 380 includes one or more segment routing encapsulating headers 385, each typically including an IPv6 header 381 and one or more SRv6 segment routing headers 382. Additionally, segment routing packet 380 includes an IPv6 data/payload field 383, including application data, encapsulated packets, and/or other values. As shown, segment routing header 386 includes a segment list with two ordered segment list elements with values of segment identifiers B::8 and D::10, and with segments left having a value of one [1].

In a segment list with n segment list elements (each storing a segment identifier), the processing/traversal order proceeds from segment list element [n−1] at the bottom of the segment list (furthest from the beginning of its segment routing header) to segment list element [0] at the top of the segment list (closest to the beginning of its segment routing header). Segments left identifies a segment list element in the segment list (e.g., a segments left value of zero identifies the segment identifier at the top of the segment list and identifies a segment identifier above all other segment identifiers in the segment list).

Segment routing header 386 shown in FIG. 3B includes segments left (storing a value) and a particular segment identifier B::8 in segment list element[1] in a particular segment list. Thus, a segments left value of one [1] identifies a segment list element of, or above, the particular segment identifier (B::8) in the particular segment list; while a segments left value of zero [0] identifies a segment list element above the particular segment identifier (B::8) in the particular segment list.

Also shown in FIG. 3B and according to one embodiment, segment identifier 390 (e.g., that of signaling segment identifier function of destination node 304) includes locator 391 with a value of B::, function value 392 with a value of eight, and argument 393 of zeros.

Figure 3C:
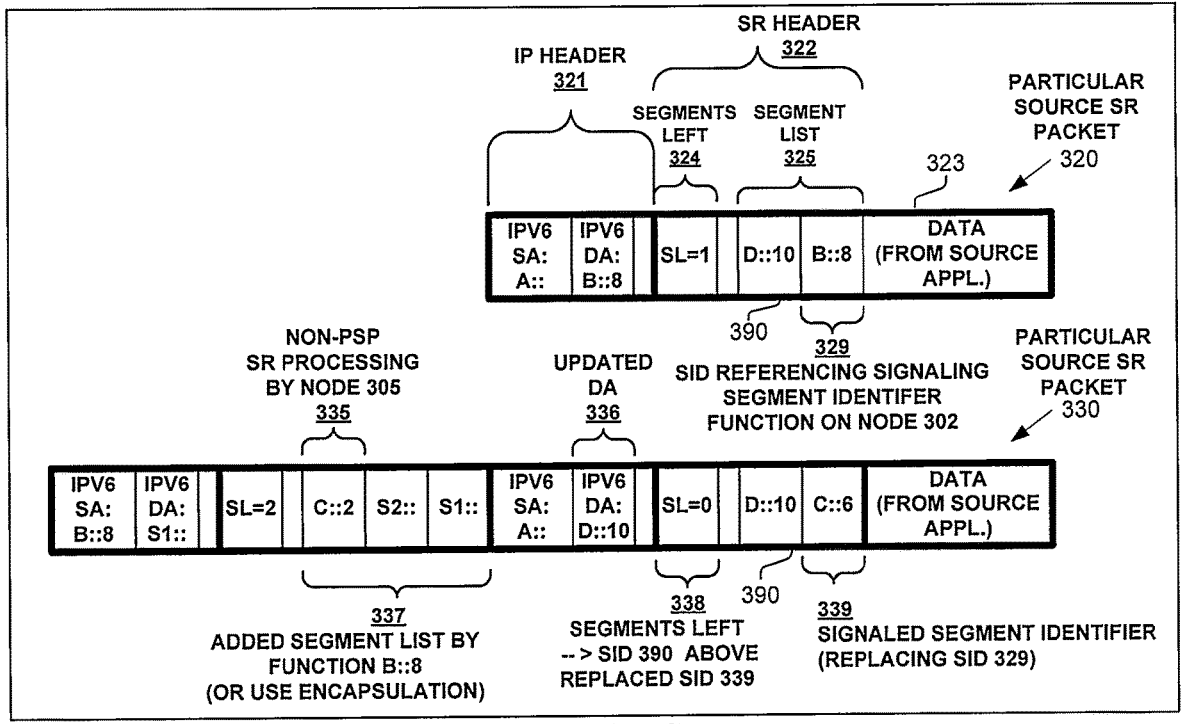
FIG. 3C illustrates segment routing packet processing of a source packet according to one embodiment.

FIG. 3C illustrates particular source segment routing packet 320 received by provider edge node 302 from client source node 301 via network forwarding based on packet 320's IP destination address of B::8 (329A). Packet 320 includes IP header 321; segment routing header 322 including segments left 324 and segment list 325; and data 323 (sometimes referred to as the payload of the packet). IP address/segment identifier B::8 is included in packet 320 as both its IP destination address (329A) in IP header 321 and as segment identifier 329 of segment list 325. Client IP address/segment identifier D::10 (390) of client destination node 306 is included in segment list 325.

Provider edge node 302 receives particular source segment routing packet 320 and modifies it as shown resulting in the source packet denoted as particular source segment routing packet 330. In one embodiment and in response to the IP destination address (329A) of B::8 of received packet 320, provider node 302 invokes a signaling segment identifier function to signal a segment identifier having a value of C::6 to client destination node 306. In doing so, signaling segment identifier function replaces segment identifier 329 (i.e., node 302's IP address of B::8 as received in packet 320) with signaled segment routing identifier 339 (node 305's IP address of C::6 for invoking a corresponding received signaled segment identifier function for use by a response packet). Segment routing processing also updates segments left (338) to a value of zero by subtracting one from segments left 324 as received in packet 320; and updates IP destination address 336 to that of the segment identifier D::10 (390) from segment list 325 (in received packet 320) at the segment list element identified by updated segments left 338 (e.g., segment list element[0]). Thus, packet 330 includes updated segments left 338 identifying segment identifier 390 (having the value of D::10) above signaled segment routing identifier 339 (having the value of C::6) in its segment list.

Further, FIGS. 3A-D and 4A-C illustrate a bi-directional network transport service use case, which is one of an innumerable number of use cases of a signaled segment identifier. Thus in one embodiment, signaling segment identifier function B::8 also adds an encapsulating IP header including segment list 337 to steer particular source packet (denoted 320, 330, 340, 350, 360) through provider nodes 303, 304, and 305 before being delivered to client destination node 306. In one embodiment, full packet encapsulated (e.g., include the received packet in data/payload of an encapsulating packet) is used rather than adding the encapsulating IP header. Also, one embodiment uses segment identifier C::2 (335) corresponding to segment routing processing by network node 305 that does not include performing a penultimate segment popping (PSP) operation that network node 305 might otherwise perform on the received particular source packet (350).

Figure 3D:
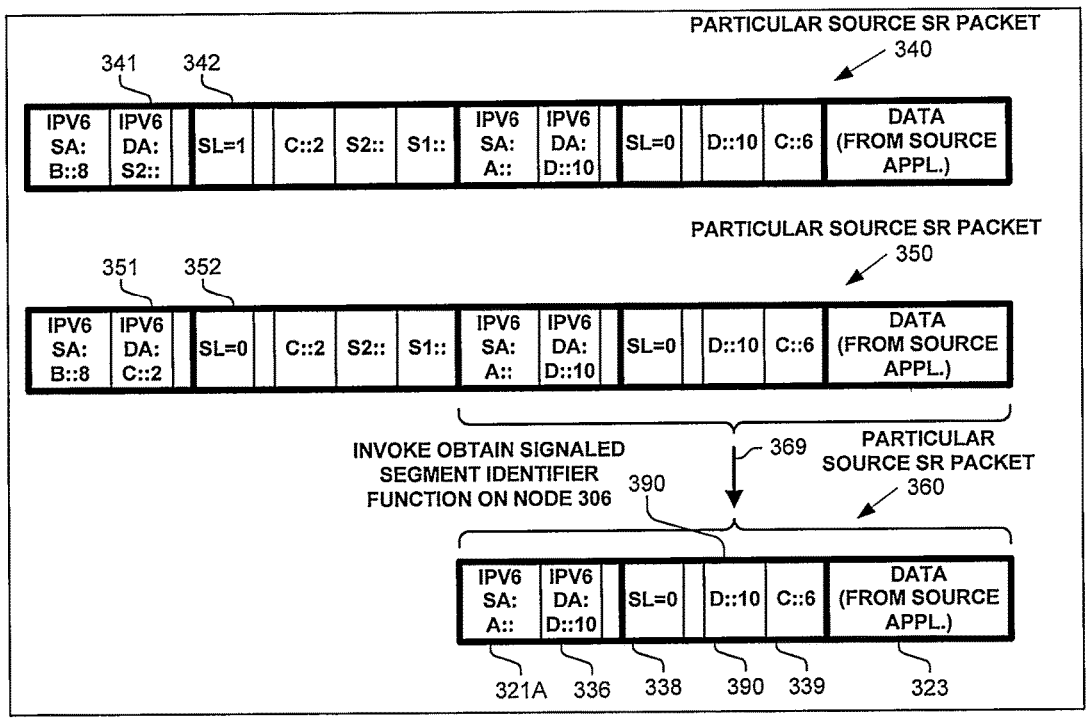
FIG. 3D illustrates segment routing packet processing of a source packet according to one embodiment.

Referencing FIGS. 3A and 3D, segment routing processing by provider edge node 303 modifies received particular source packet 330 resulting in particular source packet denoted by reference number 340, with these modifications including updating IP destination address 341 and segments left 342. Segment routing processing by provider edge node 304 modifies received particular source packet 340 resulting in particular source packet denoted by reference number 350, with these modifications including updating IP destination address 351 and segments left 352. Segment routing processing by provider edge node 305 modifies received particular source packet 350 resulting in particular source packet denoted by reference number 360. These modifications include removing (369) the encapsulating segment routing header revealing particular source packet 360 (with IP destination address 336 and segments left 338 already updated by provider edge node 302 as shown in FIG. 3C). Particular source packet 360, having both an IP destination address (336) and segment identifier D::10 (390), sent from provider edge node 305 and received by client destination node 306.

Figure 4A:
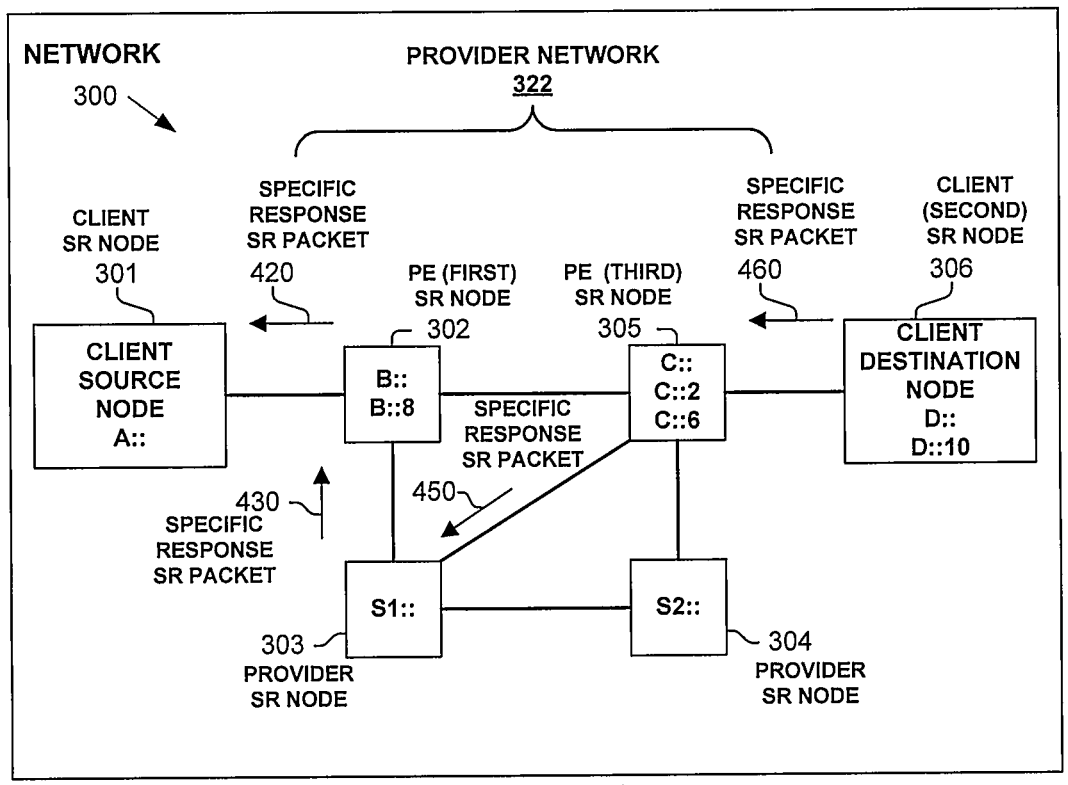
FIG. 4A illustrates a network operating according to one embodiment.

FIG. 4A illustrates a network 300, including operation according to one embodiment. In response to particular source segment routing packet 360 (FIGS. 3A-D), client destination node 306 generates and sends specific response segment routing packet 460 that will use a bi-directional provider network service offering by provider network 322 based on a signaled segment identifier invoking an obtain signaled segment routing function on client destination node 306.

Shown in the figures is a same specific response segment routing packet that is denoted using reference numbers 460, 450, 430 and 420 for referencing modifications to the same specific response segment routing packet as it traverses network 300.

In one embodiment (and with reference FIGS. 3A-D), client destination node 306 receives particular source segment routing packet 360 with a destination address of D::10 associated with an obtain signaled segment identifier function. A destination application of client destination node 306 processes information from data 323 of received particular source packet 360, including typically generating application response information. Client destination node 306 processes received particular source packet 360 according to an obtain signaled segment identifier function identified by destination address D::10. This processing includes acquiring from received packet 360 a signaled segment identifier (that has a value of C::6) and generating specific response segment routing packet 460 that includes the acquired signaled segment identifier as its IP destination address. Response packet 460, that includes the application response information, is sent from client node 306 and subsequently received by provider edge node 305 which advertises in a routing protocol an IPv6 prefix containing C::6.

In one embodiment and responsive to signaled segment identifier, provider edge node 305 invokes a corresponding received signaled segment identifier function of a network service offering. As shown in FIG. 4A and according to the network service offering, specific response segment routing packet (460, 450, 430, 420) is communicated from client destination node 304 to client source node 301 via segment routing nodes 305, 303 and 302.

A bi-directional provider network service offering may cause source packets and response packets to traverses paths that include a same or different set of segment routing nodes in provider network 322. In one embodiment, the response path is determined by a segment routing policy identified by the signaled segment identifier.

Figure 4B:
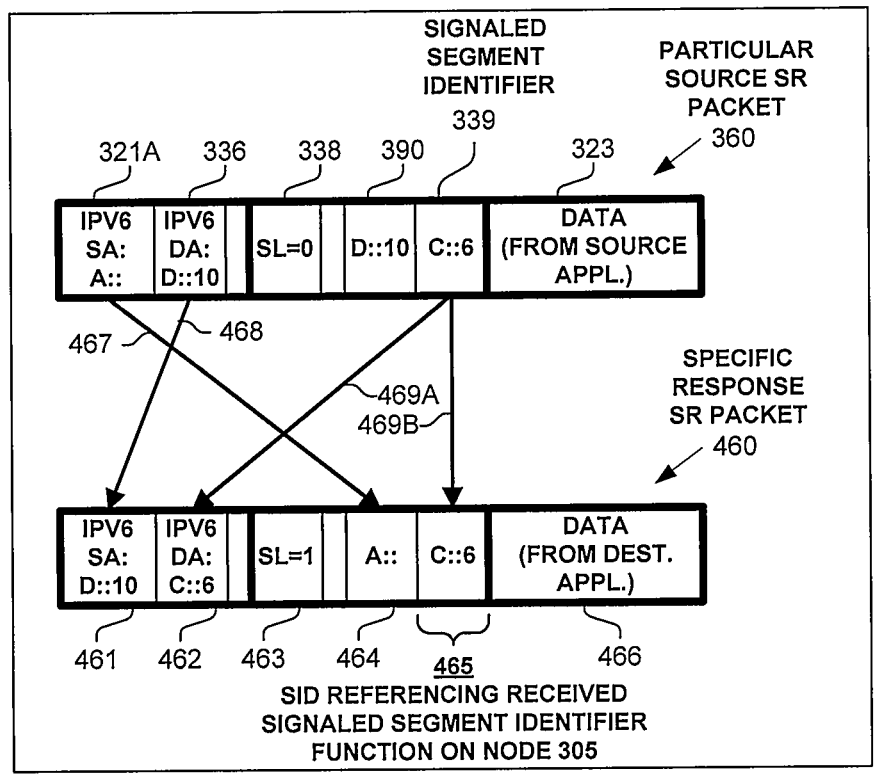
FIG. 4B illustrates segment routing packet processing of a response packet according to one embodiment.
Figure 4C:
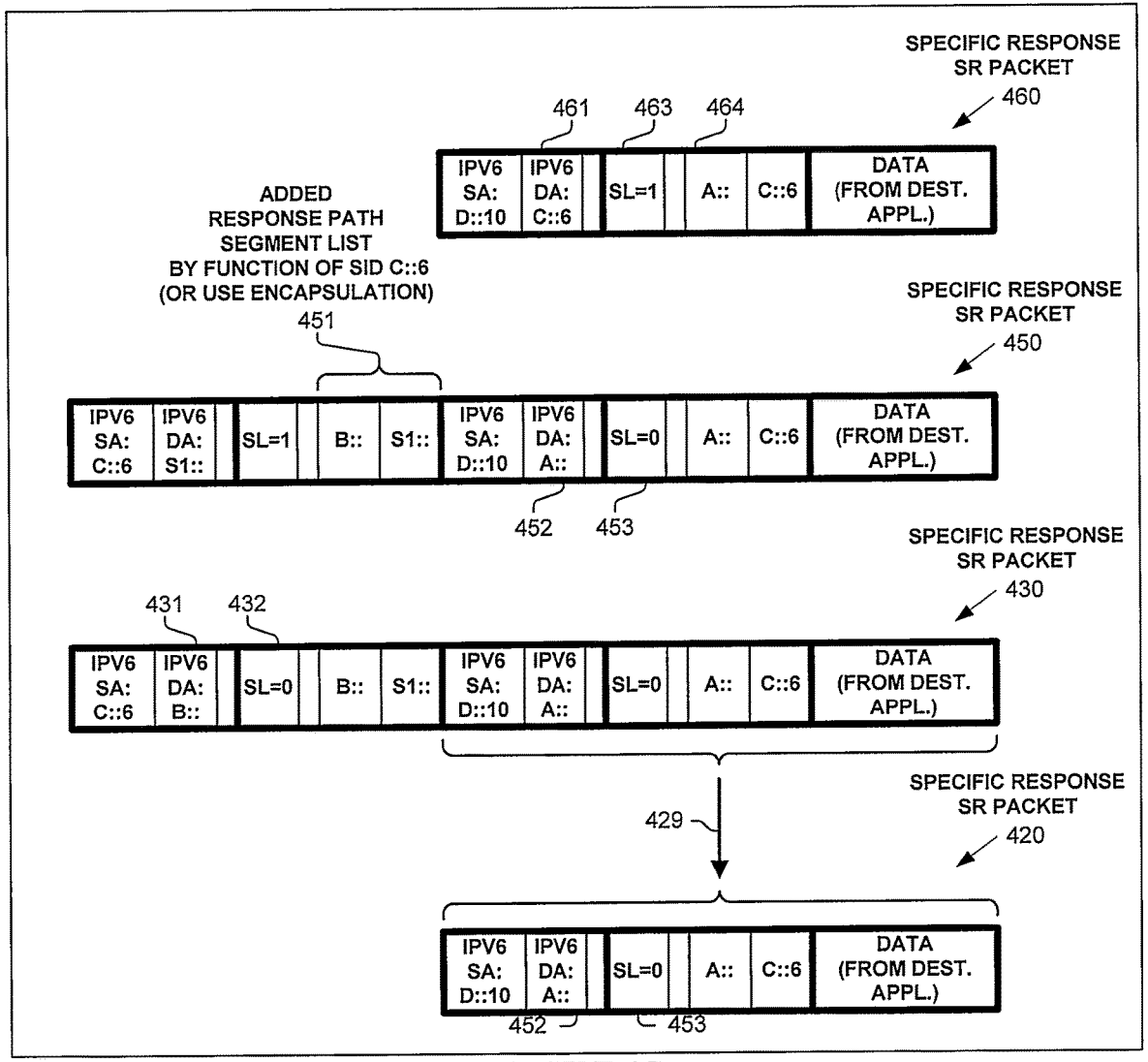
FIG. 4C illustrates segment routing packet processing of a response packet according to one embodiment.

FIG. 4B illustrates processing by a segment routing node invoking an obtain signaled segment identifier function, which in one embodiment is performed by client destination node 306 in generating specific response segment routing packet 460. A destination application of client destination node 306 processes information from data 323 of received particular source packet 360, producing response information included in the data (payload) 466 of response segment routing packet 460.

Responsive to the IP destination address 336, client destination node 306 processes received source packet 360 according to a corresponding obtain signaled segment identifier function in generating response packet 460. This processing includes:

acquiring and using (469A, 469B) signaled segment identifier 339 as IP destination address 462 and as segment identifier 465 in segment list element[1];

copying (467) source IP address 321A as segment identifier 464 in segment list element[0];

setting segments left 463 set to a value of one (i.e., identifying the acquired signaled segment identifier); and copying (468) IP destination address 336 to IP source address 461.

Referencing FIGS. 4A and C, show is specific response segment routing packet 460 sent by client destination node 306 to client source node 301 via network forwarding based on packet 460's IP destination address of C::6 (461). Provider edge node 305 receives specific response segment routing packet 460 and modifies it as shown resulting in the response packet denoted as specific response segment routing packet 450.

In one embodiment and in response to the IP destination address (461) of C::6 (which is the value of the signaled segment identifier), provider node 305 invokes a received signaled segment identifier function to steer the specific segment routing response packet (denoted 460, 450, 430, 420) through provider nodes 303 and 302. Accordingly, provider edge node 305 adds an encapsulating IP header including segment list 451 with segment identifiers corresponding to provider network nodes 303 and 302. In one embodiment, full packet encapsulated (e.g., include the received packet in data/payload of an encapsulating packet) is used rather than adding the encapsulating IP header. Segment routing processing also updates segments left (453) to a value of zero by subtracting one from segments left 463 as received in packet 460; and updates IP destination address 452 to that of the IP address A::(464) from the segment list in received packet 460.

Segment routing processing by provider edge node 303 modifies received specific response segment rouging packet 450 resulting in the response packet denoted by reference number 430. This processing includes updating IP destination address 431 and segments left 432. Segment routing processing by provider edge node 302 modifies received specific response segment routing packet 430 resulting in the response packet denoted by reference number 420. This processing includes removing (429) the encapsulating segment routing header revealing specific response segment routing 420 (with IP destination address 452 and segments left 453 already updated by provider edge node 305). Specific response segment routing packet 420, having an IP destination address A::(452), is sent from an interface of provider edge node 302 and received on an interface of client source node 301.

Figure 5:
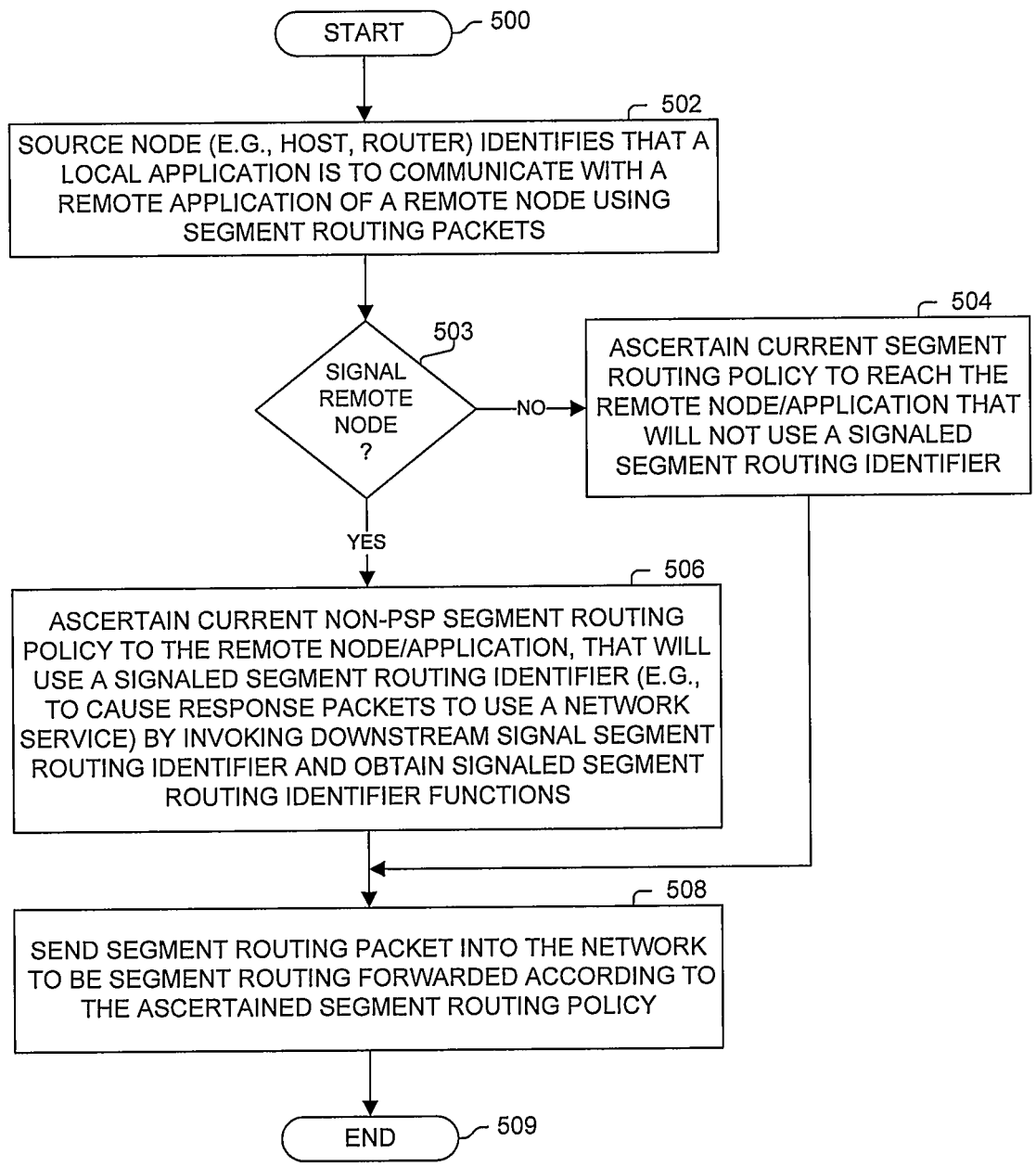
FIG. 5 illustrates a process according to one embodiment.

FIG. 5 illustrates a process according to one embodiment. Processing begins with process block 500. In process block 502, a source segment routing node (e.g., host, router) identifies that a local application is to communicate with a remote application of a remote node using segment routing packets. As determined in process block 503, if the source node is to signal to the destination segment routing node (e.g., host, router) that its received packet includes a signaled segment identifier added by an intermediate segment routing node, then processing proceeds to process block 506, else processing proceeds to process block 504.

Continuing with process block 504, the source node ascertains a current segment routing policy (as a segment routing policy can change over time e.g., to reflect the current topology of a network) to reach the remote node/application and that is not using a signaled segment routing identifier; and processing proceeds to process block 508.

Continuing with process block 506, the source node ascertains a current non-penultimate segment popping segment routing policy to traverse a network and deliver a particular source segment routing packet to the remote node/application. This policy includes segment identifiers to cause downstream processing according to a signal segment routing identifier function, and according to an obtain signaled segment routing identifier function. Processing proceeds to process block 508.

Continuing with process block 508, the source node sends the segment routing packet into the network to be segment routing forwarded according to the ascertained segment routing policy. Processing of the flow diagram of FIG. 5 is complete as indicated by process block 509.

Figure 6:
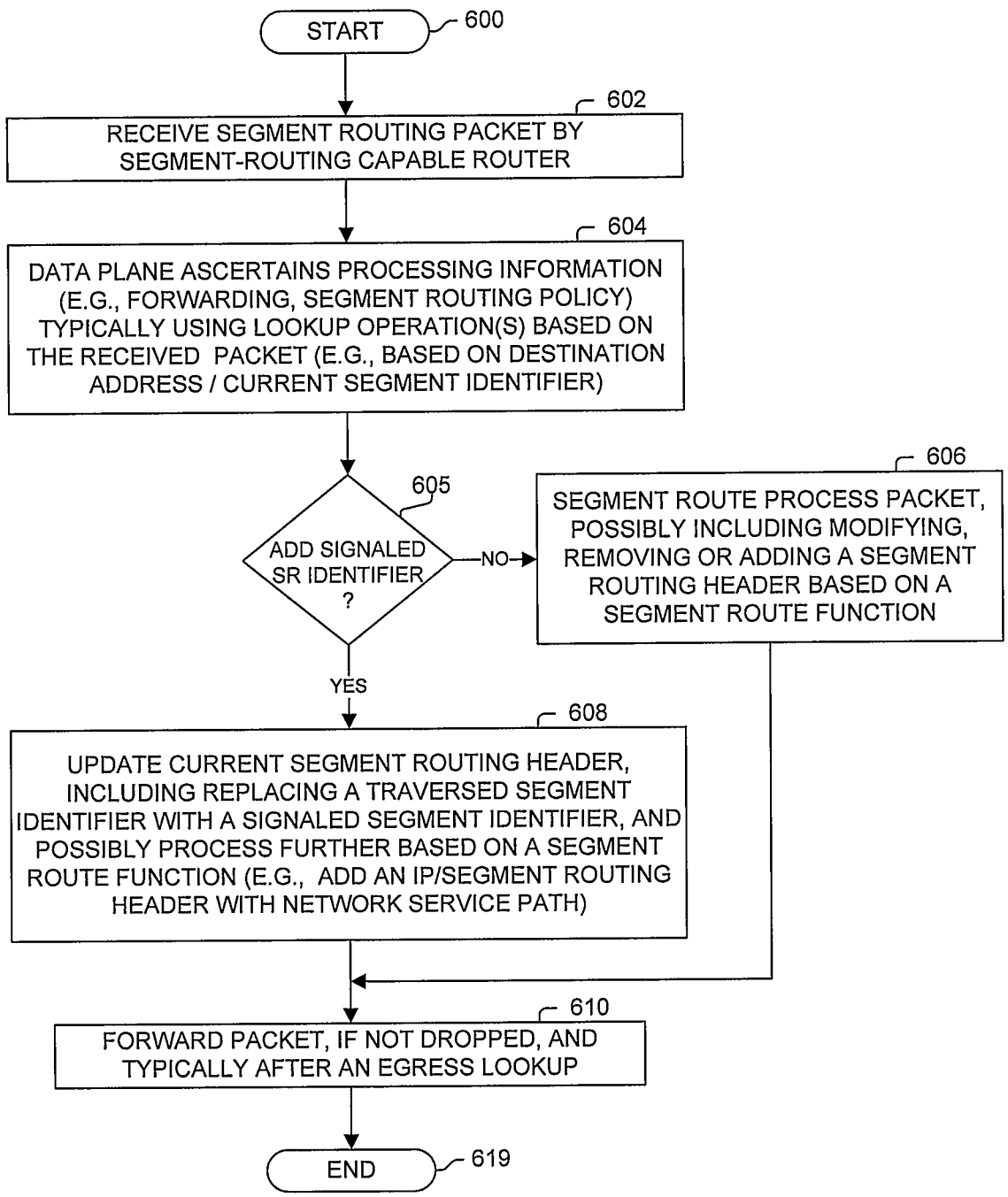
FIG. 6 illustrates a process according to one embodiment.

FIG. 6 illustrates a process performed in one embodiment. Processing begins with process block 600. In process block 602, a segment routing-capable router receives a segment routing packet. In process block 604, data plane processing ascertains packet processing information typically via one or more ingress lookup operations on an IP destination address/current segment identifier of the received segment routing packet. As determined in process block 605, if a signal segment routing function is invoked, then processing proceeds to process block 608; else processing proceeds to process block 606.

Continuing with process block 606, the received packet is segment routing processed according to the ascertained processing information (e.g., invoking a segment routing function), which may modify, add, and/or remove a segment routing encapsulating header, or even drop the packet. Processing continues to process block 610.

Continuing with process block 608, the received packet is segment routing processed according to the ascertained processing information causes processing according to a signal segment routing function which replaces a traversed/processed segment identifier in the segment list with the signaled segment identifier, and possibly performs some additional processing such as adding a segment routing encapsulating header to steer the packet through the network to a downstream node which will invoke an obtain signaled segment identifier function in processing the packet. Processing continues to process block 610.

Continuing with process block 610 and if the packet was not dropped, the router sends the updated segment routing packet into the network to be segment routing forwarded according to the ascertained segment routing policy as defined by the segment identifiers in the packet. Processing of the flow diagram of FIG. 6 is complete as indicated by process block 619.

Figure 7:
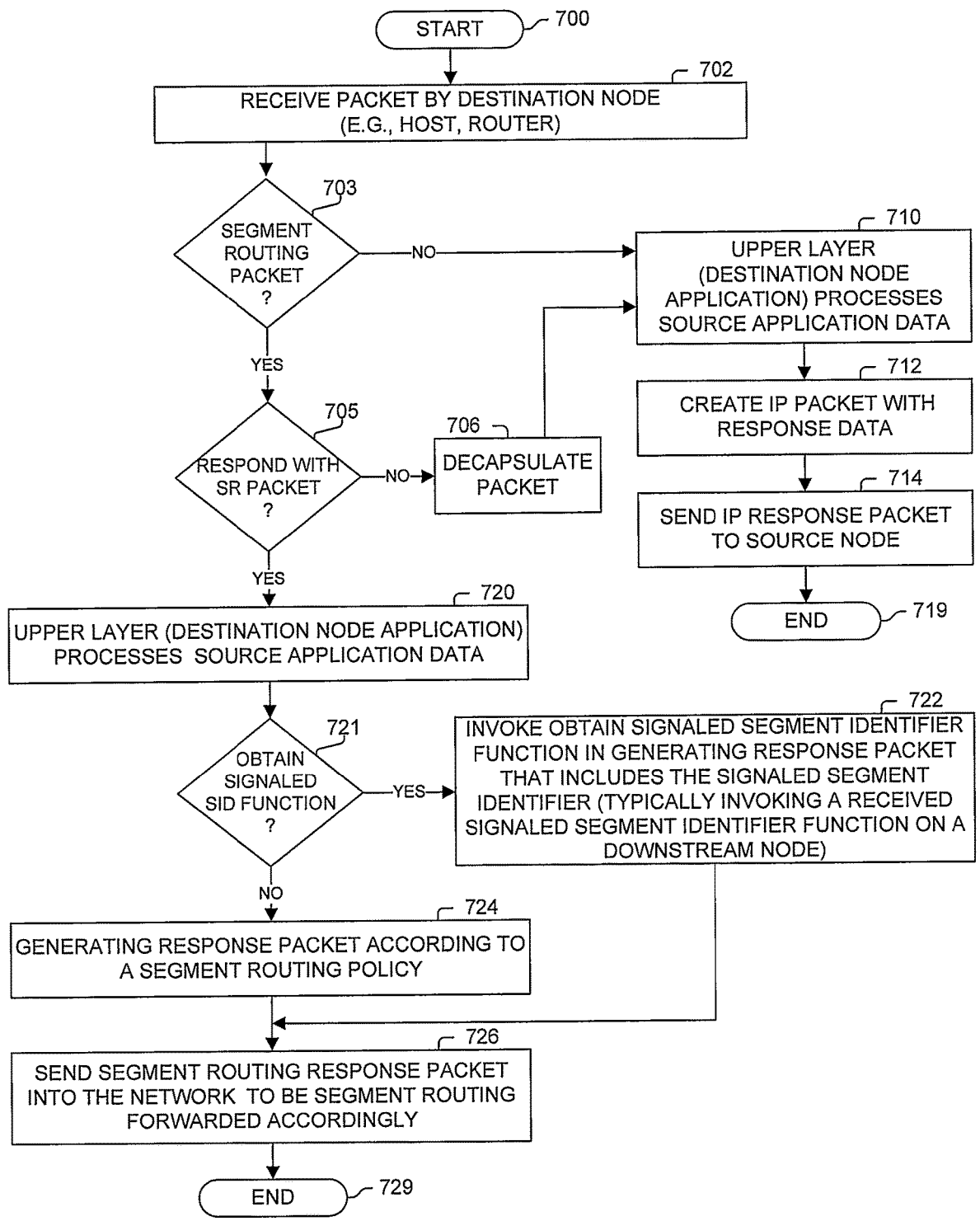
FIG. 7 illustrates a process according to one embodiment.

FIG. 7 illustrates a process according to one embodiment. Processing begins with process block 700. In process block 702, a packet is received by the destination node (e.g., host, router). As determined in process block 703, if the packet is not a segment routing packet, then processing proceeds to process block 710, else processing proceeds to process block 705. Continuing with process block 705, if the destination address (and current segment identifier in the segment list of the current segment routing header) corresponds to responding with a segment routing packet, then processing proceeds to process block 720; else processing proceeds to process block 706 wherein the segment routing transported packet is decapsulated and processing proceeds to process block 710.

Processing continues with process block 710, wherein the upper layer/destination application processes the source application data. In process block 712, an IP packet is created with response data from the destination application, and with the IP packet (addressed to the source node) being sent into the network in process block 714. Processing of the flow diagram of FIG. 7 is complete as indicated by process block 719.

Processing continues with process block 720, wherein the upper layer/destination application processes the source application information, typically generating response information. As determined in process block 721, if an obtain signaled segment identifier function is specified in the IP destination address, processing proceeds to process block 722; otherwise processing proceeds to process block 724.

Continuing with process block 724, a response segment routing packet is created with response data from the destination application, and with an ascertained segment routing policy typically based on an invoked segment routing function. Processing continues to process block 726.

Continuing with process block 722, a response segment routing packet is created according to the segment routing policy of the invoked obtain signaled segment identifier function. The response segment routing packet includes the signaled segment identifier, extracted from the received source packet, in a segment list. This response packet typically also includes response data from the destination application. In one embodiment, the signaled segment identifier does not specify a segment routing function to be invoked on a corresponding downstream node. In one embodiment, the signaled segment identifier specifies a segment routing function that will be invoked on a corresponding downstream node, such as, but not limited to, providing a forwarding path through a provider network for the response packet or performing other processing. In one embodiment, the signaled segment identifier invokes a network service (e.g., network address translation, security, firewall, traffic monitoring, traffic collection, threat protection), which may include causing the response packet to be processed by a same segment routing node (or complex) that processed the corresponding source packet. Processing continues to process block 726.

Continuing with process block 724, the destination node sends the segment routing response packet into the network. Processing of the flow diagram of FIG. 7 is complete as indicated by process block 729.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
receiving, by a first segment routing node in a network, a particular segment routing packet including a particular segment routing header comprising a particular segment list and a particular segments left, with the particular segment list when said received by the first segment routing node comprises a particular segment identifier, with the segments left when said received identifying a segment list element of, or above, the particular segment identifier in the particular segment list;
updating by, and sending into the network from, the first segment routing node the particular segment routing packet, with said updating including replacing the particular segment identifier with a signaled segment identifier in the particular segment list, and when the particular segment routing packet is said sent from the first segment routing node the segments left identifies a segment identifier above the signaled segment identifier in the particular segment list;
receiving, by a second segment routing node, the particular segment routing packet subsequent to said updating and said sending by the first segment routing node, with the segments left specifying a segment identifier above the signaled segment identifier in the particular segment list; and
obtaining the signaled segment identifier from the particular segment list of said received particular segment list by the second segment routing node and sending into the network a specific segment routing packet comprising a specific segment list or an Internet Protocol destination address including the signaled segment identifier said obtained.

2. The method of claim 1, wherein the particular segment identifier is an Internet Protocol address of the first segment routing node, and is an Internet Protocol destination address of the particular segment routing packet; and wherein said replacing the particular segment identifier is performed in response to a signaling segment identifier function of the first segment routing node, with the signaling segment identifier function identified in the particular segment identifier.

3. The method of claim 1, comprising:
receiving the specific segment routing packet by a third segment routing node having an Internet Protocol address of the signaled segment identifier; and
performing received signal packet processing on the specific segment routing packet by the third segment routing node according to a received signaled segment identifier function identified in the signaled segment identifier.

4. The method of claim 3, wherein said received signal packet processing by the third segment routing node on the specific segment routing packet includes adding to the specific segment routing packet one or more response path segment identifiers specifying a segment routing path through the network.

5. The method of claim 4, wherein said updating, by the first segment routing node, the particular segment routing packet includes adding to the particular segment routing packet one or more source path segment identifiers specifying a segment routing path through the network.

6. The method of claim 5, wherein the first segment routing node and the third segment routing node are provider edge routers; and wherein the second segment routing node is a customer host device.

7. The method of claim 3, wherein said obtaining the signaled segment identifier from the particular segment list of said received particular segment list is performed in response to an obtain signaled segment identifier function identified in a particular Internet Protocol destination address of the particular segment routing packet when received by the second segment routing node.

8. The method of claim 7, wherein said replacing the particular segment identifier with the signaled segment identifier is performed according to a signal segment identifier function identified in a particular Internet Protocol destination address of the particular segment routing packet when received by the first segment routing node.

9. The method of claim 7, wherein the particular segment identifier is said replaced with the signaled segment identifier in the last segment list element in the particular segment list according a signal segment identifier function identified in a particular Internet Protocol destination address of the particular segment routing packet when received by the first segment routing node.

10. The method of claim 9, wherein the specific segment routing packet includes the signaled segment identifier in a last segment list element of the specific segment list when said sent from the second segment routing node.

11. The method of claim 1, wherein the specific segment routing packet includes the signaled segment identifier in the last segment list element of the specific segment list when said sent from the second segment routing node.

12. The method of claim 11, wherein the particular segment identifier is said replaced with the signaled segment identifier in the last segment list element in the particular segment list according a signal segment identifier function identified in a particular Internet Protocol destination address of the particular segment routing packet when received by the first segment routing node.

13. The method of claim 1, wherein the particular segment identifier is said replaced with the signaled segment identifier in the last segment list element in the particular segment list according a signal segment identifier function identified in a particular Internet Protocol destination address of the particular segment routing packet when received by the first segment routing node.

14. An apparatus, comprising:

one or more hardware interfaces sending and receiving packets in a network; and one or more network processors with memory associated therewith;

wherein the apparatus, communicatively coupled to a network, performs packet processing operations including segment routing-capable (SR-capable) packet processing operations, with a particular segment identifier being an Internet Protocol address of the apparatus and identifying a signal segment identifier function, and with said packet processing operations including:

receiving from the network a particular segment routing packet including the particular segment identifier as a particular Internet Protocol (IP) destination address and a particular IP source address, and a particular segment routing header comprising a particular segment list and a particular segments left, with the particular segment list when said received by the apparatus comprising a signaled segment identifier, and with the segments left when said received by the apparatus identifying a position above the signaled segment identifier;

responsive to said received particular segment routing packet, operating according to the signal segment identifier function including generating a specific segment routing response packet including the signaled segment identifier as a specific IP destination address and the particular segment identifier as a specific IP source address, and a specific segment list comprising the particular IP source address; and sending into the network said generated specific segment routing response packet.

\* \* \* \* \*